G. E. BURT.
HARVESTER.
No. 85,274. Patented Dec. 29, 1868.
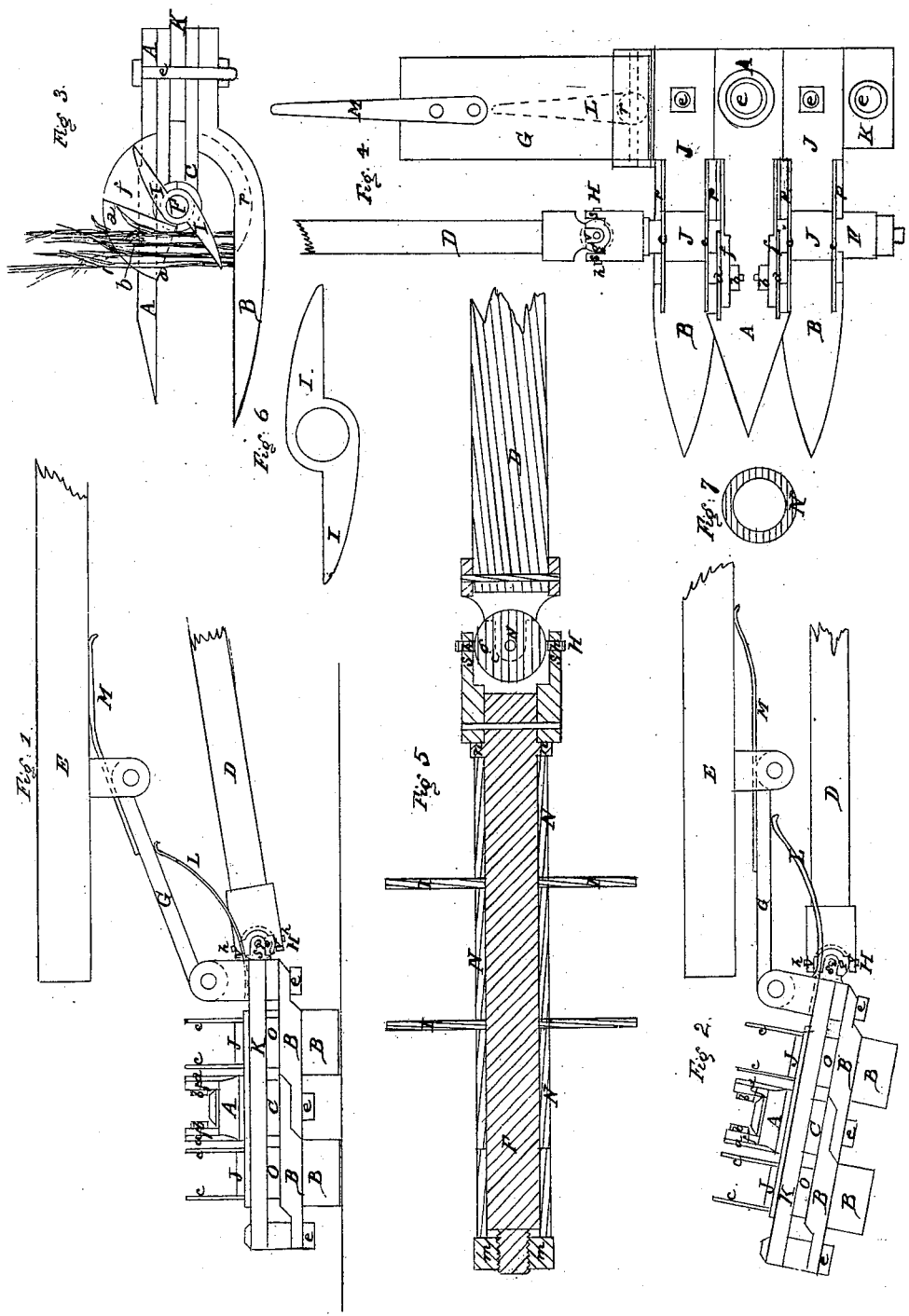

United States Patent Office.

GEORGE E. BURT, OF HARVARD, MASSACHUSETTS.

Letters Patent No. 85,274, dated December 29, 1868

IMPROVEMENT IN HARVESTERS.

The Schedule referred to in these Letters Patent and making part of the same.

*To all whom it may concern:*

Be it known that I, GEORGE E. BURT, of Harvard, in the county of Worcester, and State of Massachusetts, have invented new and useful Attachments to Mowing-Machines; and I do hereby declare that the following is a full, clear, and exact description of the construction and operation of the same, reference being had to the accompanying drawings, and to the letters of reference marked thereon, in which—

Figure 1 is a rear side view, with the cutter-bar down in working-position, showing two cutters.

Figure 2 is a view of the same parts as fig. 1, with the cutter-bar elevated.

Figure 3 is a side view of the upper and lower guards, showing the position of the shears and the grass when the machine is in operation.

Figure 4 is a bird's-eye view of two cutters and their guards, showing the position of the guards, the revolving-cutter shaft, and the spring-attachments.

Figure 5 is a section of the revolving shaft, the cutters, the sleeves, the propelling-shaft, and the flexible coupling.

Figure 6 is a side view of one of the revolving cutters.

Figure 7 is a transverse section of a sleeve when taken off from the shaft F.

Like letters represent like parts in all the figures.

It is well known that by the reciprocal or crank-motion employed to operate the cutters in mowing-machines, a large amount of power is required to operate the knives with the necessary speed to cut the grass. This high speed of the crank is very straining on all the parts, requiring very strongly-constructed machines, and constant and diligent care in lubricating the parts most exposed. Great liability of injury is incurred by the rapid motion, especially in the liability of the cutters coming in contact with stones or other obstacles when in operation.

I am aware that many efforts have been made to substitute a rotary in place of the reciprocal cutter, but as yet none have been constructed that have proved practical. They were generally defective in cutting the grass, or their revolving parts became clogged with the grass, or were very liable to injury by coming in contact with stones or other obstacles.

The object of my invention is to overcome the above objections, to lighten the draught of the machine, and to avoid side-draught.

My invention consists in constructing rotary shears, with double cutting-edges, so arranged that a rotary motion will effectually cut all the grass that comes between them.

Also, in constructing the revolving-cutter shaft with a series of thimbles or sleeves, so arranged that all the revolving shears are effectually held in their proper position on the shaft, by a single screw-nut on the end of the shaft.

Also, in so constructing and arranging sections of guards, to cover the spaces between the supporting-boxes of the rotary shears, as to form shields for the shaft its entire length, thus avoiding all liability of the grass winding upon the revolving shaft and clogging the machine.

Also, in applying a spring-attachment to cutter-bars, so arranged as to lift a large portion of the weight of the cutter-bar from the ground, thus relieving the team of a large portion of the draught caused by the friction of the cutter-bar on the ground, and also lessening the side-draught.

These improvements may be attached to most of the mowing-machines now in use.

I attach to the cutter-bar two sets of guards, A and B B, one set some two inches, more or less, above the other. The upper set are so placed as to cover the space or opening between the lower set of guards. The upper guards should be of sufficient width to overlap the lower guards. (Shown in figs. 3 and 4.)

The lower guard, B, is constructed with recesses, *p p*, in each side, in which the points of the cutters I I revolve. This recess forms a case, which shields the revolving cutter from all liability of coming in contact with any obstacles.

The flanges *f f* are constructed of sufficient width to receive the stationary cutters *a a*, which are secured to them by the screw-bolts *b b*, and the guard A overlaps their cutting-edges, thus forming shields to protect them from injury. (Shown in figs. 3 and 4.)

The revolving shaft F is held in its position by boxes formed by a part of the guard A and the box C. (Shown in figs. 1, 2, and 3.)

The revolving shaft F is provided with sleeves, N N N, and the cutters I are provided with holes of sufficient size (figs. 5 and 6) to fit the revolving shaft, which is constructed with a screw-nut, *m*, and shoulder, *n*, on its ends. The sleeves are of sufficient length to set the cutters such a distance apart that they will meet the stationary cutters.

Any desirable number of cutters and sleeves is placed upon the shaft to make the cutter-bar of the usual length.

The sleeves N form checks or clamps, and all are firmly held in their exact position by the screw-nut *m* and shoulder *n*. (Shown in fig. 5.)

J J are shields, that cover the space of revolving shaft between the upper guards A.

All the guards and shields are firmly secured to the cutter-bar K by the bolts *e e e*. (Shown in figs. 1, 2, 3, and 4.)

J J are provided with flanges or shields, *c c*, of sufficient height to protect the revolving knives I I, and steady the grass while it is being cut by the shears.

Each guard B overlaps the next guard B where it is attached to the cutter-bar, as seen in figs. 1 and 2, so that each guard B is secured by two bolts to the cutter-bar.

The propelling-shaft D is connected with the revolving-cutter shaft F by the flexible coupling H, constructed in such a manner that the cutter-shaft will be flexible at its joints, so that the rotary-cutter shaft and the propelling-shaft will revolve freely at the various angles made by the cutter-bar and the driving-shaft D, when in operation. (Shown in figs. 1 and 2.)

The coupling is constructed, as above, by the ball $g$, the ears $v\ v, s\ s$, and the pivots $i\ i, h\ h$. (Figs. 2, 4, and 5.( I construct the spring L of sufficient strength to lift some three-fourths (more or less, as is desirable,) of the weight of the cutter-bar, and attach it either to the cutter-bar K or the arm G, as is most convenient, so arranged as to lift upon the outer end of the cutter-bar, and thus hold up a certain portion of its weight, but still allow the bar to follow the irregular surface of the ground.

In the drawing, the spring is attached by the bolt $r$ to the cutter-bar K, and acts on the arm G, tending to lift a portion of the cutter-bar, and lessen the friction on the outer end of the cutter-bar. (Shown in figs. 1, 2, and 4.)

I construct the spring M of sufficient strength to lift three-fourths, more or less, of the cutter-bar K and arm G, and attach it either to the frame E or the arm G.

In the drawings, the spring M is attached to the arm G, and rests against the frame E, tending to lift the arm G and cutter-bar K, thus avoiding a large amount of the friction usually caused by the cutter-bar dragging on the ground when in operation, but still allowing the cutter-bar to follow the uneven surface of the ground. (Seen in figs. 1 and 2.)

These springs may be constructed of flat steel, of coiled wire, or of rubber, as may be best adapted to the construction of various machines, as I have used with equal success, on full-sized machines, both the flat spring, the coil, and the rubber.

The rotary cutter may be applied to most mowing-machines now in use, by substituting a new cutter-bar, and connecting the gearing with the propelling-shaft D. In some instances it may be found necessary to provide the propelling-shaft D with a flexible coupling at each end.

The rotary cutters I are placed around the shaft F spirally, and held in this position by screwing down the nut $m$.

Operation.

When the machine moves forward into the standing grass, the guards B B penetrate the grass in the usual manner, the upper guards, A, being placed directly over the spaces left by the lower guards. The grass is bent by the two guards, which brings it across the edges of the stationary cutters $a\ a$. The revolving shaft F, being connected with the driving-gearing, causes the cutters I I to revolve. The lower guards having opened a passage for the revolving cutters, they operate upon the grass, in connection with the stationary cutters, and form rotary shears, which cut off all the grass. (Figs. 1, 3, and 4.)

The grooves $p\ p$, in B, and the flanges $c\ c$, on the shields J, completely shield the cutters from all liability of coming in contact with stones or stumps, as it will be seen that nothing can get against the cutters except small and limber substances, that can yield to the guards.

The flanges $c\ c$ steady the grass, and hold it while the cutters are cutting it. (Figs. 1 and 4.)

The shields J, with the boxes O, completely cover the revolving shaft F, and thus leave no part of the shaft exposed to the grass, for it to wind upon and clog the shaft.

The flexible coupling H permits the cutter-bar to assume any desirable angle, without cramping any of the connecting-gearing.

The spring L operates to lift the outer end of the cutter-bar, by resting against the arm G, and the spring M operates to lift both the arm G and the cutter-bar, thus lessening the friction caused by the cutter-bar when in operation. It will be seen that, as the resistance of the cutter-bar is overcome, the side-draught is in proportion avoided, and the draught of the machine lessened.

The method of holding the cutters on the revolving shaft, by the friction of the sleeves or collars against their sides, secures the cutters, perfectly, from any liability of being broken. It will be seen that if the screw-nut $m$ is turned down sufficiently hard to hold the cutters to cut grass, if any substance should get in, sufficiently hard to break them, the cutters would slip between the collars or sleeves. Thus, the cutters and all other parts of the machine are securely protected against any accident, or injury caused by hard substances getting into the cutters by any means.

The flanges $a$ and $c$ form shields for the revolving cutters, and protect them from coming in contact with any substance above the guard A, thus obviating all liability of the driver getting injured by the cutters, should he get thrown from his seat.

The cutters I, being set spirally around the shaft F, cut the grass successively as the shaft revolves, and not simultaneously, as they would if set in a straight line. Thus, the resistance is always the same, avoiding any jerks or shocks caused by all the knives cutting simultaneously, as they do with the crank-motion.

The stationary cutters $a$, being attached to the upper guard-fingers by a bolt, can be removed, sharpened, and replaced without disturbing the rotary cutters I.

Having described the construction, application, and operation of my improvements,

What I claim as new, and desire to secure by Letters Patent, is—

1. The combination of the lower guard-finger B, the upper guard-finger A, the stationary cutter $a$, on the upper guard-finger, and the vertically-revolving cutter I, all arranged and operating substantially as described.

2. The combination of the revolving shaft F, the cutters I I, the collars N, held in position by the screw-nut $m$, substantially as described.

3. The stationary cutters $a$, when attached to the guard-finger by a bolt in such a manner that said cutters may be removed, ground, and replaced without disturbing the moving cutters, substantially as herein set forth.

4. The spring L, when so arranged and applied that it will tend to lift the outer end of the cutter-bar, substantially as described, for the purpose set forth.

5. The rotary cutter I, so arranged that, if submitted to undue strain, it will yield to the pressure, and allow the shaft to turn without injury to the machine, substantially in the manner and for the purpose set forth.

GEORGE E. BURT.

Witnesses:
S. B. HILDRETH,
E. A. HILDRETH.